United States Patent [19]

Yanagisawa et al.

[11] Patent Number: 5,532,993

[45] Date of Patent: Jul. 2, 1996

[54] VIBRATION DAMPING SUSPENSION MECHANISM FOR RECORDED DATA REPRODUCING APPARATUS

[75] Inventors: Tatsuya Yanagisawa; Nobuo Nohtomi; Nobutaka Sawada; Fumiya Yamada; Kiyohito Kajihara; Kiyoshi Morikawa; Atsushi Kurosawa; Tomomichi Kimura; Toshiroh Yamashita, all of Kawagoe, Japan

[73] Assignee: Pioneer Electronic Corporation, Tokyo, Japan

[21] Appl. No.: 340,441

[22] Filed: Nov. 14, 1994

Related U.S. Application Data

[63] Continuation of Ser. No. 12,844, Feb. 4, 1993.

[30] Foreign Application Priority Data

Feb. 6, 1992 [JP] Japan ................... 4-012928 U
Feb. 6, 1992 [JP] Japan ................... 4-012929 U

[51] Int. Cl.⁶ .................................. G11B 33/08
[52] U.S. Cl. ........................ 369/75.1; 360/97.02
[58] Field of Search .................... 369/263, 247, 369/248, 75.1, 75.2, 292; 360/97.02; 248/584, 589, 593

[56] References Cited

U.S. PATENT DOCUMENTS

| | | | |
|---|---|---|---|
| 3,592,422 | 7/1971 | Norman | 248/589 |
| 3,927,888 | 12/1975 | van der Lehy | 369/263 |
| 4,731,777 | 3/1988 | Yoshitoshi et al. | 369/263 |
| 4,794,588 | 12/1988 | Yoshitoshi et al. | 369/763 |
| 4,831,476 | 5/1989 | Branc et al. | 360/97.02 |
| 4,841,499 | 6/1989 | Takahashi et al. | 369/263 |
| 4,937,806 | 6/1990 | Babson et al. | 369/75.1 |
| 5,042,024 | 8/1991 | Kurosawa et al. | 369/75.1 |
| 5,163,038 | 11/1992 | Arai | 369/77.2 |

FOREIGN PATENT DOCUMENTS

| | | |
|---|---|---|
| 0197159 | 10/1985 | European Pat. Off. . |
| 0507345A2 | 4/1992 | European Pat. Off. . |
| 1052251 | 2/1989 | Japan ................... 369/263 |
| 2-287984 | 11/1990 | Japan . |

*Primary Examiner*—Stuart S. Levy
*Assistant Examiner*—Paul J. Ditmyer
*Attorney, Agent, or Firm*—Keck, Mahin & Cate

[57] ABSTRACT

A vibration damping support mechanism for a recored data reproducing apparatus is provided which allows the apparatus to be installed in either a horizontal or vertical position without shifting the tensioning direction of damper springs. Each pair of the damping springs is mounted between a main reproducing unit and an outer casing. The two damper springs are arranged to extend in the thicknesswise and depthwise directions of the main reproducing unit respectively or arranged tilting at a predetermined angle. In the horizontal position, external vibrations are absorbed by the elastic action of one of the two damper springs and thus prevented from propagating directly to the main reproducing unit. Similarly in the vertical position, such external vibrations are absorbed by the elastic action of the other damper spring and prevented from propagating directly to the same. In another construction, a damper spring is mounted between a side panel of the main reproducing unit and a projection of each spring loaded arm rotatably mounted to the outer casing. The spring loaded arm rotates 90 degrees when is actuated by a shift lever pressed with each shift pin of a vertical mounting bracket, thus resetting its damper spring for corresponding to the horizontal or vertical position of the main reproducing unit. In a further construction, a connecting rod arranged extending at one end outward from the outer casing is used to rotate the spring loaded arm through 90 degrees upon coming into direct contact with e.g. the floor of a vehicle.

4 Claims, 11 Drawing Sheets

VIBRATION DAMPING SUSPENSION MECHANISM FOR RECORDED DATA REPRODUCING APPARATUS

This is a continuation of application Ser. No. 08/012,844, filed Feb. 4, 1993.

BACKGROUND OF THE INVENTION

1. Field of the Invention

The present invention relates to a vibration damping support mechanism for a recorded data reproducing apparatus for playback of data recorded on a data recording medium such as a CD.

2. Prior Art

Recorded data reproducing apparatuses, e.g. home CD players, are substantially designed for use in a horizontal position. However, a car CD player is limited to the size which should be accommodated in a narrow, given space of the interior or trunk room of the car. More particularly, its construction is determined to set in a vertical or horizontal position depending on the shape of an available installation area and the relation to other components. To this end, car CD players or recorded data reproducing apparatuses are required to offer the freedom of installation.

We, the inventors, developed a number of CD players capable of being installed in either a horizontal or vertical position and also, performing an optimum data pickup action in its position. As disclosed in Japanese Patent Application No. 1-109666 (1989), one of the invented car CD players is for example illustrated in FIG. 1 where a support frame 1 is suspended by a floating suspension system in an outer casing 2. The floating suspension system comprises four dampers $2a_1$ to $2a_4$ filled with a viscous fluid, e.g. silicon oil, and fixedly mounted to the four inside corners of the outer casing 2 and four support bars $2b_1$ to $2b_4$ inserted at one end to their respective dampers $2a_1$ to $2a_4$. The other ends of the support bars $2b_1$ to $2b_4$ are mounted to four support plates $1a_1$ to $1a_4$ respectively which are fixedly attached to the support frame 1.

The support frame 1 contains a magazine 3 which has a plurality of trays placed one over the other and serves as a disk changer for replacement of a disk by advancing a selected one of the trays to a pickup station. In action, the selected tray $3b_n$ carrying a desired disk $3a_n$ is moved out by a given kickout mechanism to a playback position shown in FIG. 1. The disk $3a_n$ is then held at the position by a clamper (not shown) and its recorded data is read out with a pickup 3c for playback.

Figure 1:
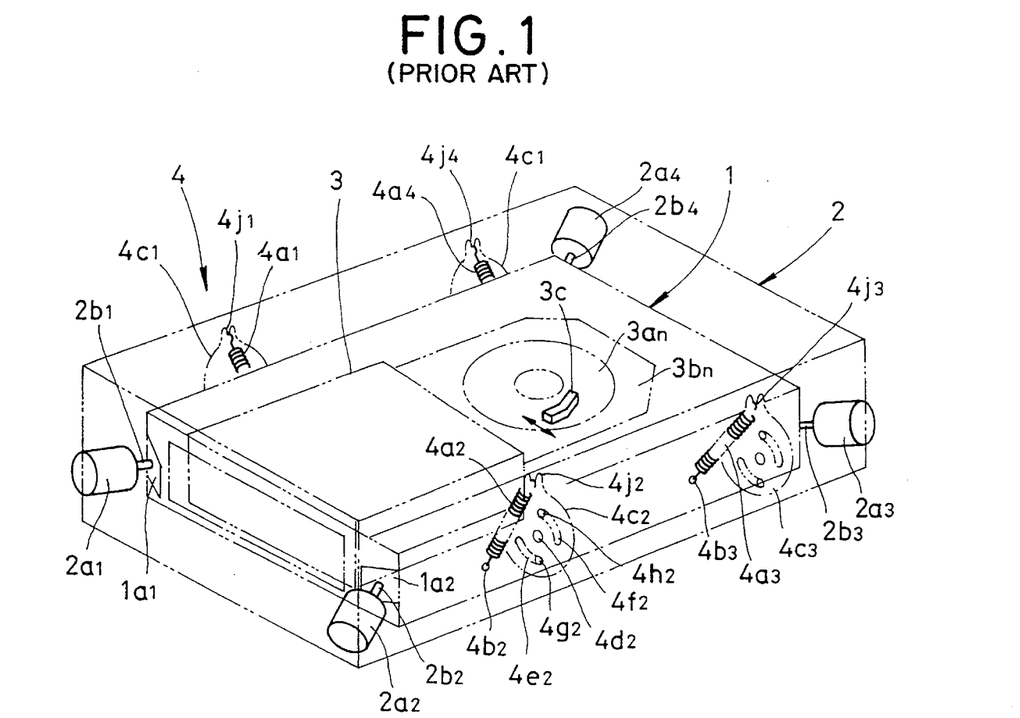
FIG. 1 is a view of a prior art vibration damping support mechanism for a recorded data reproducing apparatus introduced by the same inventors.

In addition, a vibration damping mechanism 4 is provided between the outer side of the support frame 1 and the inner side of the outer casing 2. The vibration damping mechanism 4 comprises four damper springs $4a_1$ to $4a_4$ mounted at one end to the outer side of the support frame 1 and at the other end to the inner side of the outer casing 2. More particularly, the damper springs $4a_1$ to $4a_4$ are pivotably fitted at lower end to four pivot pins $4b_1$ to $4b_4$ respectively mounted on the outer side of the support frame 1 and at upper ends to projecting portions $4j_1$ to $4j_4$ of four rotary plates $4c_1$ to $4c_4$ respectively mounted to the inner side of the outer casing 2.

The rotary plate $4c_2$ is mounted by a pivot pin $4d_2$ to the inner side of the outer casing 2 for rotating movement. The rotary plate $4c_2$ has two arcuate slots $4e_2$ and $4f_2$ arranged therein symmetrical about the pivot pin $4d_2$, each slot extending through 90 degrees. The two arcuate slots $4e_2$, $4f_2$ are adapted to engage with a pair of guide pins $4g_2$ and $4h_2$ fixedly mounted to the inner side of the outer casing 2. The other three rotary plates $4c_1$, $4c_3$, $4c_4$ are constructed in the same manner.

As the CD player is placed in a horizontal position, the projecting portions $4j_1$ to $4j_4$ of the rotary plates $4c_1$ to $4c_4$ come upward and the damper springs $4a_1$ to $4a_4$ extend almost vertically so that the support frame 1 is suspended by the outer casing 2. During the running of a vehicle carrying the CD payer, resultant upward and downward stress caused by vibration or shaking will be absorbed by the elastic action of the damper springs $4a_1$ to $4a_4$, thus hardly affecting the support frame 1.

When the CD player is shifted from its horizontal position to a vertical position, the four rotary plates $4c_1$ to $4c_4$ are turned 90 degrees in the same direction so that the damper springs $4a_1$ to $4a_4$ extend depthwisely of the outer casing 2. As the result, the support frame 1 can be suspended upright in the outer casing 2 placed vertically. During running, external stress resulting from vibration and shaking will also be absorbed by the elastic actions of the damper springs $4a_1$ to $4a_4$ thus hardly acting on the support frame 1.

The car CD player can be placed in either a horizontal or vertical position after the tensioning direction of the damper springs $4a_1$ to $4a_4$ is adjusted by turning their respective rotary plates $4c_1$ to $4c_4$. Accordingly, the installation of the CD player will arbitrarily be determined depending on an applicable space in the interior of a car. However, the disadvantage is that all the damper springs $4a_1$ to $4a_4$ have to be manually reset to extend in one direction whenever the CD player is shifted from one position to the other.

The turning of the rotary plates $4c_1$ to $4c_4$ for resetting the damper springs $4a_1$ to $4a_4$ in a given direction is a troublesome task. It may hence happen that the CD player is placed to a desired position while one or more of the rotary plates, e.g. $4c_1$ to $4c_4$ shown in FIG. 1, remain unturned in the original position. Also, after the installation, it will be hard to examine whether the damper springs $4a_1$ to $4a_4$ are correctly reset to extend in the same direction.

If any of the damper springs $4a_1$ to $4a_4$ is placed in a different direction, external stress resulting from vibration or shaking during running will not effectively be absorbed but transmitted through the dampers $2a_1$ to $2a_4$ to the support frame 1 which, in turn, starts vibrating. This will result in functional deterioration of the dampers $2a_1$ to $2a_4$ and cause a disk loading and a playback mechanism of the magazine 3, including the pickup 3c, contained in the support frame 1 to perform faulty actions or become defective.

OBJECTS AND SUMMARY OF THE INVENTION

It is an object of the present invention, for elimination of the foregoing disadvantage, to provide a vibration damping support mechanism for a recorded data reproducing apparatus in which the tensioning direction of damper springs is automatically shifted corresponding to either the horizontal or vertical installation position in order to perform an optimum cushioning action for suspending the weight of a main recorded data reproducing unit of which a loading mechanism and a playback device are thus protected from external vibration and shock.

It is an another object of the present invention to provide a vibration damping support mechanism for a recorded data reproducing apparatus in which the support frame is mounted by oppositely extending damper springs to an outer casing. In action, external vibrations can efficiently be absorbed by the elastic action of the damper springs without resetting the damper springs when the reproducing apparatus is changed from its original position to a horizontal or vertical position. As the result, the loading mechanism and playback device in the support frame will be protected from the external vibrations.

More particularly, a vibration damping support mechanism for a recorded data reproducing apparatus having a first feature of the present invention comprises spring loaded arms mounted rotatably on the inner surfaces of side panels of an outer casing which contains a main recorded data reproducing unit, damper springs mounted between holding portions of the spring loaded arms and the side panels of the recorded data reproducing unit, and shift levers extending outward from rotating centers of the spring loaded arms for rotation together with the spring loaded arms. Each of the shift levers is arranged to turn the spring loaded arm 90 degrees corresponding to the positional change of the recorded data reproducing apparatus to either a horizontal or vertical position.

In the action of the vibration damping support mechanism for a recorded data reproducing apparatus having the first feature, the spring loaded arms are turned 90 degrees for resetting the tensioning direction of the damper springs to provide optimum cushioning effects when the recorded data reproducing apparatus is changed from its original position to a horizontal or vertical position e.g. on the floor of a vehicle. More specifically, for horizontal installation, the damper springs are set thicknesswisely of the main reproducing unit and, for vertical installation, they are set depthwisely of the same. In either case, the main reproducing unit can successfully be suspended by the vertically tensioned damper springs in the outer casing. Accordingly, external stresses caused by vibration and shaking during the running of the vehicle will efficiently be absorbed by the elastic action of the damper springs thus being prevented from transmitting directly to the main reproducing unit.

Also, a vibration damping support mechanism for a recorded data reproducing apparatus having a second feature of the present invention comprises spring loaded arms mounted rotatably on the inner surfaces of side panels of an outer casing which contains a main recorded data reproducing unit, damper springs mounted between the spring loaded arms and the side panels of the recorded data reproducing unit, and connecting rods pivotably mounted to the spring loaded arms and extended at one end outward from the outer casing. Each of the connecting rods is arranged to turn the spring loaded arm 90 degrees corresponding to the positional change of the recorded data reproducing apparatus to either a horizontal or vertical position.

In the action of the vibration damping support mechanism for a recorded data reproducing apparatus having the second feature, the connecting rod which is pivotably mounted to the spring loaded arm for rotating it 90 degrees and, particularly, arranged to extend at one end outward from the outer casing, comes into direct contact with the floor of the vehicle when the apparatus is set to the vertical position and moves into the outer casing to turn the spring loaded arm 90 degrees.

Furthermore, a vibration damping support mechanism for a recorded data reproducing apparatus having a third feature of the present invention is provided for supporting a main recorded data reproducing unit by the elastic action of vibration damping elements mounted on both sides of the main recorded data reproducing unit in an outer casing. The vibration damping element comprises a holding projection provided on the side panel of the main recorded data reproducing unit, two holding portions provided on the inner surfaces of the side panel of the outer casing, and a pair of damper springs mounted between the holding portions and the holding projection to extend in different directions so that one of the two damper springs absorbs vibrations appearing in the thicknesswise direction of the main recorded data reproducing unit while the other absorbs vibrations appearing in the depthwise direction of the same.

In the action of the vibration damping support mechanism for a recorded data reproducing apparatus having the third feature, when the recorded data reproducing apparatus is changed from its original position to a horizontal or vertical position e.g. on the floor of a vehicle, one of each two damping springs works corresponding to the new position and prevents external stresses caused by vibration and shaking during the running of the vehicle from transmitting directly to the main reproducing unit. If the apparatus has to be placed in a tilting position due to an applicable space for the installation inside the vehicle, the two damper springs serve in combination as a damping element to prevent direct propagation of the external vibrations to the main reproducing unit.

Still furthermore, a vibration damping support mechanism for a recorded data reproducing apparatus having a fourth feature of the present invention is provided for supporting a main recorded data reproducing unit by the elastic action of vibration damping elements mounted on both sides of the main recorded data reproducing unit in an outer casing. The vibration damping element comprises a holding projection provided on the side panel of the main recorded data reproducing unit, two holding portions provided on the inner surface of the side panel of the outer casing, and a pair of damper springs mounted between the holding portions and the holding projection. The tensioning direction of the two damper springs is set at a predetermined angle such that the movement of the holding projection is limited to a small area while a load is applied in different directions.

In the action of the vibration damping support mechanism for a recorded data reproducing apparatus having the fourth feature, one of two damper springs of which tensioning direction is set at such an angle that the movement of the holding projection to which the two springs are coupled at one end is limited to a small area, is hardly interfered in the elastic action by the other damper spring. Accordingly, unwanted propagation of external vibration to the main reproducing unit will successfully be avoided.

DETAILED DESCRIPTION OF THE PREFERRED EMBODIMENTS

Preferred embodiments of the present invention will be described in more detail referring to the accompanying drawings.

Figure 2:
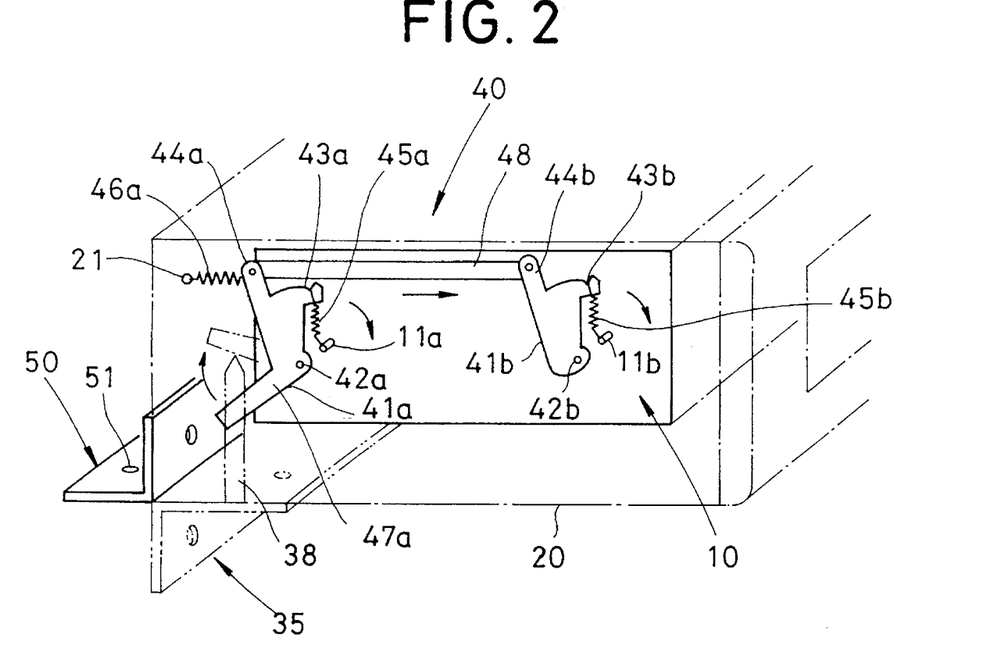
FIG. 2 is a view of a vibration damping support mechanism showing an embodiment of the present invention associed with a first feature.
Figure 5:
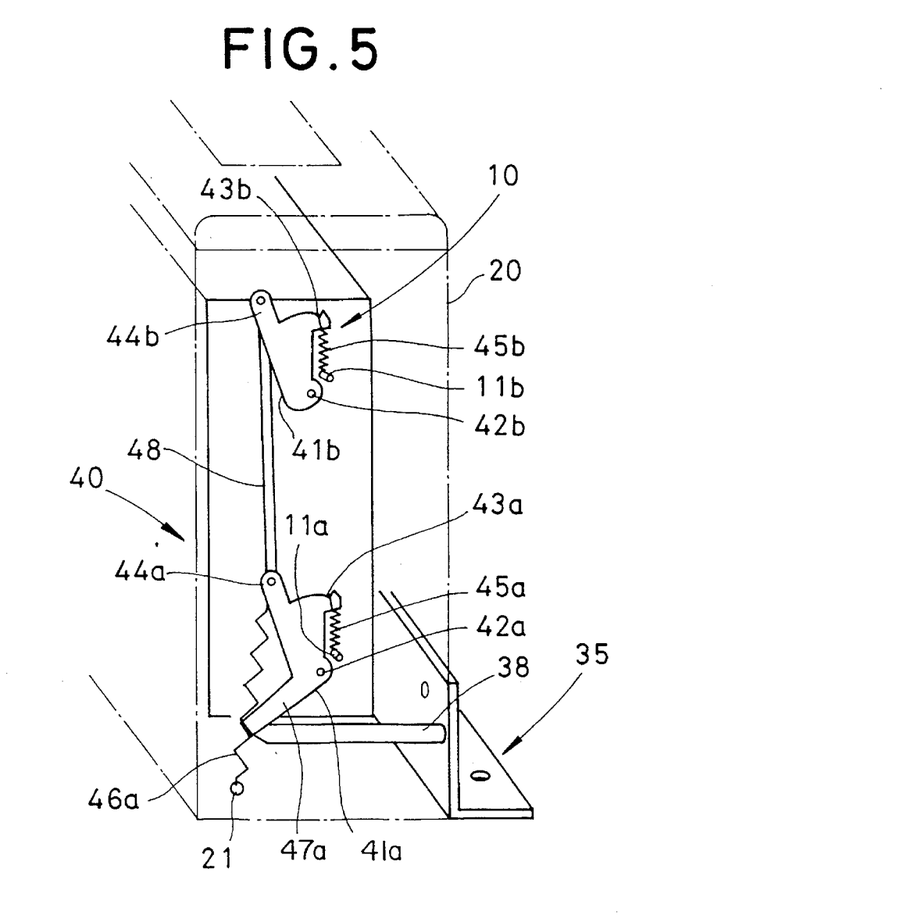
FIG. 5 is a view showing the reproducing apparatus of FIG. 2 placed in a vertical position.

Illustrated in FIGS. 2 and 5 is a vibration damping support mechanism having the first feature of the present invention for use in a recorded data reproducing apparatus. In FIG. 2, the reproducing apparatus is placed in a horizontal position. More specifically, an outer casing 20 which contains a main reproducing unit 10 of the apparatus is secured by a horizontal mounting bracket 50 to e.g. the floor of a vehicle. Similar to the arrangement of the prior art CD player of FIG. 1, the main reproducing unit 10 contains a magazine container, a loading mechanism, a pickup device, and other primary components. Also, the main reproducing unit 10 is suspended by four dampers, not shown in FIG. 2, mounted to the four inside corners of the outer casing 20 in the same fashion as shown in FIG. 1.

The main reproducing unit 10 is supported by an elastic action of the vibration damping support mechanism 40 in the outer casing 20. The vibration damping support mechanism 40 comprises four spring loaded arms, two 41a, 41b being provided at each side of the main reproducing unit 10. FIG. 2 shows the two spring loaded arms 41a, 41b of the near side.

The spring loaded arm 41a is mounted on the inner wall of a side panel of the outer casing 10 for pivotal movement about a pivot pin 42a. Similarly, the spring loaded arm 41b is mounted on the inner wall of the side panel of the outer casing 10 for pivotal movement about a pivot pin 42b.

The spring loaded arm 41a has two holding portions 43a, 44a. There is a damper spring 45a coupled at one end to the holding portion 43a of the spring loaded arm 41a and at the other end to a holding projection 11a mounted to a side panel of the main reproducing unit 10. The other holding portion 44a of the spring loaded arm 41a is coupled to one end of a return spring 46a which is secured at the other end to a holding projection 21 mounted to the inner wall of a rear panel of the outer casing 20. Also, the spring loaded arm 41a has a shift lever 47a formed integral therewith to extend outward from the pivotal pin 42a. The shift lever 47a may be a separate piece arranged movable together with the spring loaded arm 41a.

The spring loaded arm 41b also has two holding portions 43b, 44b. A damper spring 45b is mounted between the holding portion 43b of the spring loaded arm 41b and a holding projection 11b provided on the side panel of the main reproducing unit 10. The other holding portion 44b of the spring loaded arm 41b is coupled by a connecting rod 48 to the holding portion 44a of the spring loaded arm 41a.

In common state, the two spring loaded arms 41a, 41b remain urged by the yielding force of the return spring 46a in a counter-clockwise direction. Simultaneously, the two spring loaded arms 41a, 41b are tensioned in the clockwise direction by the force of the damper springs 45a, 45b as being loaded with the weight of the main reproducing unit 10. The spring factors of the damper springs 45a, 45b and the return spring 46a are determined so that the damper springs 45a, 45b extend properly in the direction of the thickness of the main reproducing unit 10 which is placed in the horizontal position as shown in FIG. 2.

For horizontal installation of the reproducing apparatus, the outer casing 20 is tightened to e.g. the floor of a vehicle with the horizontal mounting bracket 50. The horizontal mounting bracket 50 may be an L-shaped channel having screw holes 51 provided therein. The outer casing 20 also has an equal number of screw holes (not shown) provided in the side panel thereof to match the screw holes 51 of the horizontal mounting bracket 50.

In the reproducing apparatus placed in the horizontal position on the floor of a vehicle, the damper springs 45a, 45b extend in the thickness direction of the reproducing apparatus 10 or in the vertical direction. More particularly, the main reproducing unit 10 is vertically suspended by the damper springs 45a, 45b in the outer casing 20. When an external stress due to vibration or shock is exerted onto the main reproducing unit 10 of the reproducing apparatus during the running of the vehicle, it is effectively absorbed by the elastic action of the damper springs 45a, 45b and thus prevented from propagating directly to the main reproducing unit 10. Accordingly, primary components, e.g. a loading mechanism and a pickup device, in the main reproducing unit 10 will be protected from external vibrations.

Figure 3:
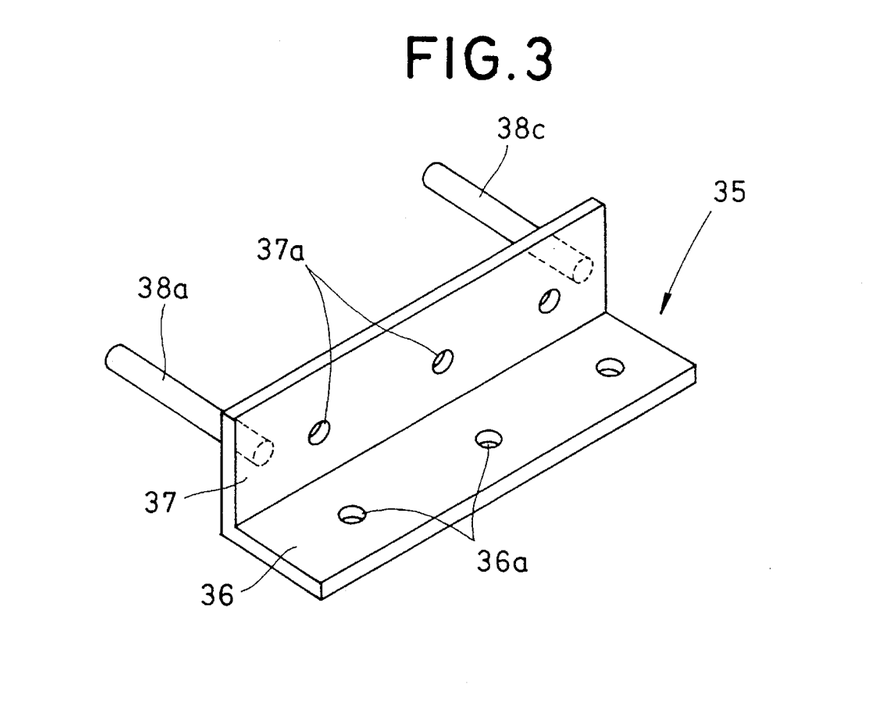
FIG. 3 is a view of a vertical mounting bracket of a long length for use with the vibration damping support mechanism shown in FIG. 2.

For vertical installation of the reproducing apparatus, a vertical mounting bracket 35 shown in FIG. 3 is used. The vertical mounting bracket 35 may be an L-shaped channel comprising a bottom portion 36 for tightening to e.g. the floor of a vehicle and an upright portion 37 arranged at a right angle to the bottom portion 36. The bottom portion 36 has a plurality of screw holes 36a through which retaining screws are tightened to the floor of the vehicle. The upright portion 37 also has a plurality of screw holes 37a through which retaining screws are tightened to the side panel of the outer casing 20.

The upright portion 37 of the vertical mounting bracket 35 has two shift pins 38a and 38c extending from the outer casing 20 side thereof. Each of the shift pins 38a, 38c has a length enough to extend through pin holes (not shown)

provided in the side panel of the outer casing 20 and press against the shift lever 47a of the spring loaded arm 41a so that the spring loaded arm 41a turns 90 degrees in the clockwise direction about the pivot pin 42a as shown in FIG. 2. In reality, the shift pin 38a presses the shift lever 47a of the near side shown in FIG. 2 while the shift pin 38c presses the unshown shift lever of the far side.

In use, the vertical mounting bracket 35 having the two shift pins 38a, 38c shown in FIG. 3 is fitted with its upright portion 37 extending widthwisely of the outer casing 20. This arrangement is not limitative and it is also possible to have a pair of mounting brackets of a shorter length attached to both ends of the widthwisely extending side or rear panel of the outer casing 20 for securing.

Figure 4:
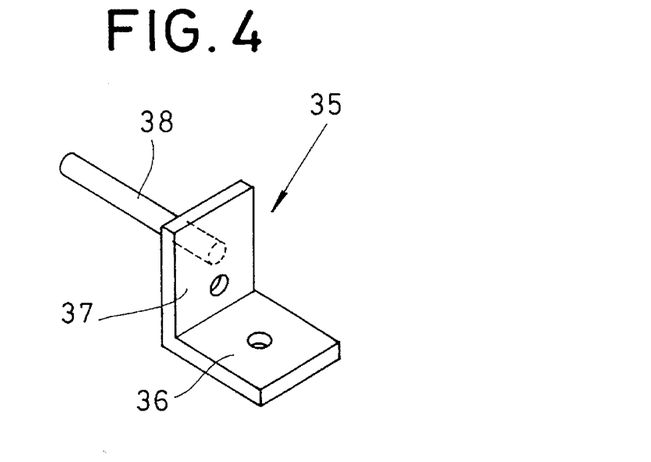
FIG. 4 is a view of a vertical mounting bracket of a short length for use with the vibration damping support mechanism shown in FIG. 2.

Such a vertical mounting bracket of a short length may be an L-shaped channel 35 comprising a bottom portion 36 and an upright portion 37 provided with an outwardly extending shift pin 38, as best illustrated in FIG. 4. The two mounting brackets 35 of the short length are applicable in any combination to both ends of the rear panel of the outer casing 20.

For vertical installation of the reproducing apparatus, the vertical mounting bracket 35 is tightened to the outer casing 20 allowing the shift pins 38 to extend inward through the unshown pin holes of the same. The shift pin 38 inserted into the outer casing 20 comes at its front end into contact with the shift lever 47a of the spring loaded arm 41a. As the shift pin 38 moves further against the restoring force of the return spring 46a, it presses the spring loaded arm 41a which then turns 90 degrees in the clockwise direction about the pivot pin 42a as shown with two-dot lines in FIG. 2.

The turning motion of the spring loaded arm 41a is transmitted via the connecting rod 48 to the other spring loaded arm 41b. The spring loaded arm 41b hence turns 90 degrees about the pivot pin 42b in the same direction as the spring loaded arm 41a. After the spring loaded arms 41a, 41b are turned 90 degrees, the damper springs 45a, 45b extend in the depthwise direction of the main reproducing unit 10.

Then, the reproducing apparatus is placed in the vertical position with its outer casing 20 secured by the vertical mounting bracket 35 to the floor of the vehicle. As the result, the main reproducing unit 10 is vertically suspended by the four damper springs 45a, 45b in the outer casing 20, as shown in FIG. 5. External forces exerted to the reproducing apparatus due to vibration and shaking during the running of the vehicle are upward and downward in FIG. 5 and will thus be effectively absorbed by the elastic action of the damper springs 45a, 45b and prevented from propagating directly to the main reproducing unit 10. Accordingly, the primary components in the main reproducing unit 10, including a loading mechanism and a pickup device, can be protected from external vibrations.

The arrangement of the shift lever 47a and the shift pin 38 for turning the spring loaded arm 41a or 41b to 90 degrees may be replaced with any other means capable of setting the spring loaded arms 41a, 41b in responding to the horizontal or vertical position of the reproducing apparatus by turning through 90 degrees. For example, the connecting rod 48 is extended to project outward from the rear panel of the outer casing 20 for ease of turning the spring loaded arms 41a, 41b, as shown in FIG. 6.

Figure 6:
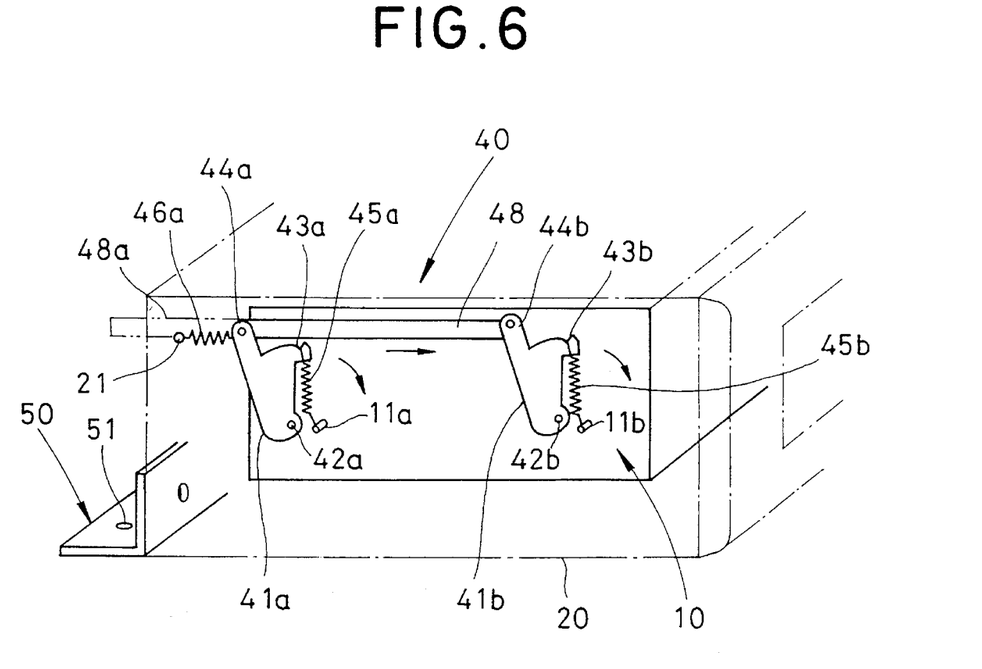
FIG. 6 is a view of a vibration damping support mechanism showing another embodiment of the present invention associated with a second feature.

FIG. 6 illustrates another vibration damping support mechanism for a recorded data reproducing apparatus associated with the second feature of the present invention. As shown, four spring loaded arms 41a and 41b at the near and far sides are identical in the shape. The two spring loaded arms 41a, 41b at the near side are coupled to each other by a connecting rod 48 which is pivotably mounted at both ends to holding portions 44a, 44b of their respective arms 41a, 41b. The connecting rod 48 is longer in length than that shown in FIGS. 2 to 5. More specifically, the connecting rod 48 has an extension 48a projecting outward from an aperture (not shown) provided in the rear panel of an outer casing 20.

There are two damper springs 45a, 45b mounted between the two holding portions 43a, 43b of the spring loaded arms 41a, 41b and the projections 11a, 11b of a main reproducing unit 10 respectively for suspending the main reproducing unit 10. Also, a return spring 46a is mounted between a projection 21 of the outer casing 20 and a holding portion 44a of the spring loaded arm 41a. The spring factors of the damper springs 45a, 45b and the return spring 46a are determined so that the damper springs 45a, 45b substantially extend in the direction of the thickness of the main reproducing unit 10 placed in the horizontal position as shown in FIG. 6. The return spring 46a may be omitted if desired.

In the horizontal position, the main reproducing unit 10 is suspended by the vertically extending damper springs 45a, 45b in the outer casing 20. The outer casing 20 is secured by a horizontal mounting bracket 50 to the floor of a vehicle. External stresses caused by vibration and shaking during the running will be effectively absorbed by the elastic action of the damper springs 45a, 45b and the main reproducing unit 10 can thus be protected from unwanted vibrations.

For setting the reproducing apparatus to a vertical position on the floor of a vehicle, the outer casing 20 is placed with its rear panel down where the extension 48a of the connecting rod 48 is projected. As the rear panel of the outer casing 20 comes into direct contact with the floor, the extension 48a of the connecting rod 48 is pressed into the outer casing 20 and thus, the connecting rod 48 is moved to the right in FIG. 6.

Figure 7:
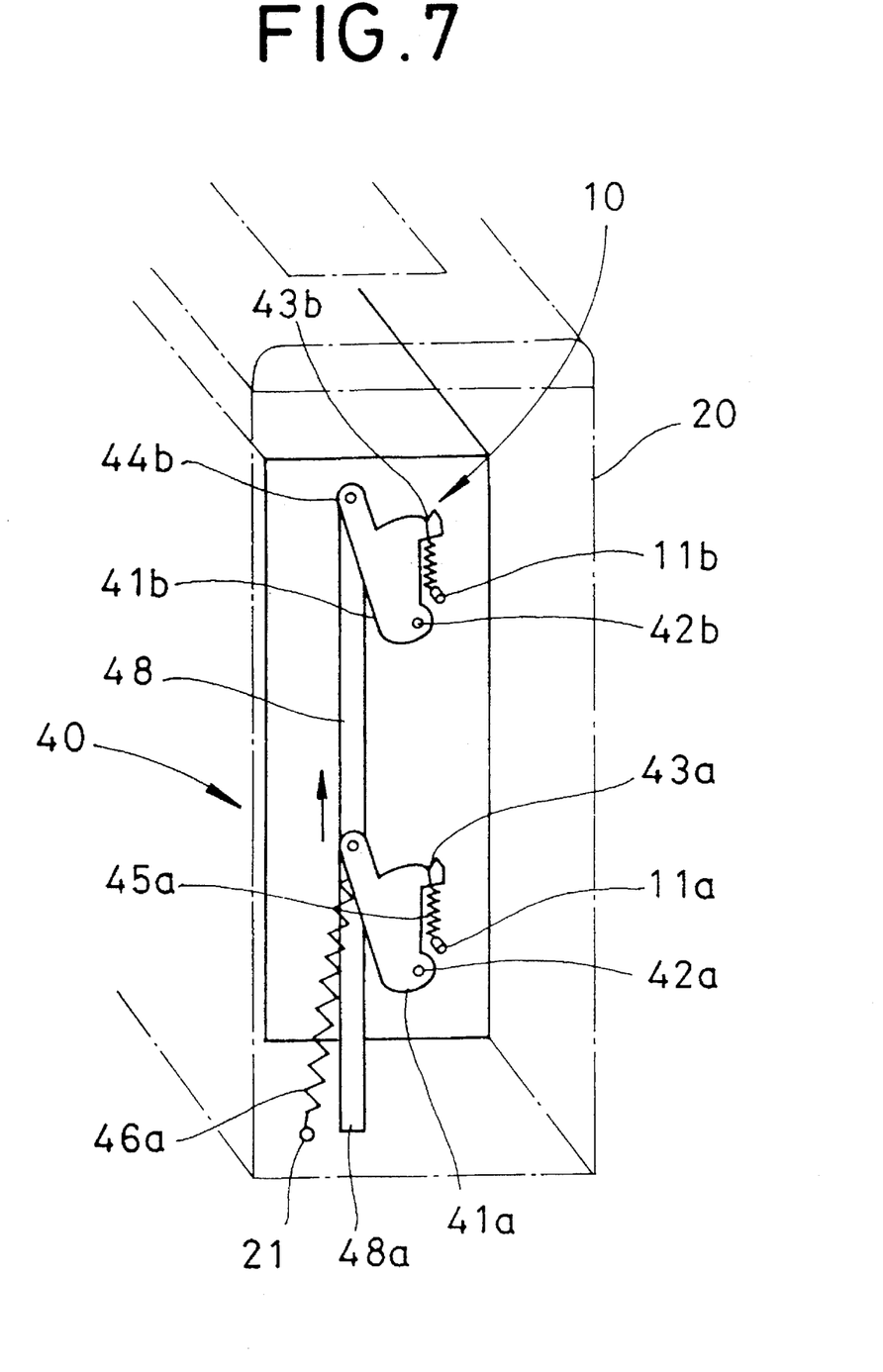
FIG. 7 is a view showing the reproducing apparatus of FIG. 6 placed in a vertical position.

The movement of the connecting rod 48 turns the spring loaded arms 41a, 41b about their respective pivot pins 42a, 42b to 90 degrees. After the spring loaded arms 41a, 41b are turned 90 degrees in the clockwise direction, the damper springs 45a, 45b extend in the depthwise direction of the main reproducing unit 10 as shown in FIG. 7. Then, the outer casing 20 arranged upright is secured to the floor of the vehicle by a vertical mounting bracket 35.

The 90-degree turning of the spring loaded arms 41a, 41b with the extension 48a of the connecting rod 48 requires no use of the shift pins 38 of the vertical mounting bracket 35 shown in FIG. 2. Also, the L-channel shapes of the horizontal 50 and vertical mounting bracket 35 can be identical to (ach) other.

The extension 48a of the connecting rod 48 projecting out from the rear panel of the outer casing 20 may be utilized as a member of a lock mechanism. For example, an appropriate locking arm is provided on the rear panel of the outer casing 20 for clamping the extension 48a in order to permit no movement of the connecting rod 48. Accordingly, the main reproducing unit 10 remains protected from abrupt shock during transportation or in storage. For installation, the outer casing 20 will be secured in a horizontal or vertical position to e.g. a vehicle floor only after the locking of the extension 48a is released.

In any of the embodiments shown in FIGS. 2 to 5, 6 and 7, the spring loaded arms 41a, 41b are turned 90 degrees corresponding to the horizontal or vertical position of the reproducing apparatus. As the result, the damper springs 45a, 45b are shifted to extend in the suspending direction or at a right angle to the floor. Accordingly, external stresses and vibrations exerted after the installation and causing faults or erratic actions are efficiently absorbed by the elastic action of the damper springs 45a, 45b and thus, will rarely be transmitted to the main reproducing unit 10.

As set forth above, the vibration damping support mechanism of the present invention employs a plurality of spring loaded arms which can turn to an appropriate position corresponding to the horizontal or vertical position of the reproducing apparatus. When the reproducing apparatus is placed in either the horizontal or vertical position, the damper springs associated with their respective spring loaded arms are always set to extend vertically. This allows the damper springs to absorb any external stress or vibration caused during the running of the vehicle, whereby propagation of the stress or vibration to the main reproducing unit will be prevented. The tensioning direction of the damper springs can systematically be shifted from one to the other corresponding to the installation position of the reproducing apparatus and such troublesome resetting of the same as needed in the prior art will be eliminated. Accordingly, the damper springs are always set in a correct direction and their elastic action will be ensured to provide optimum effects with no presence of erratic counter-balancing actions caused by setting fault, thus protecting the main reproducing unit from undesired vibrations.

Figure 8:
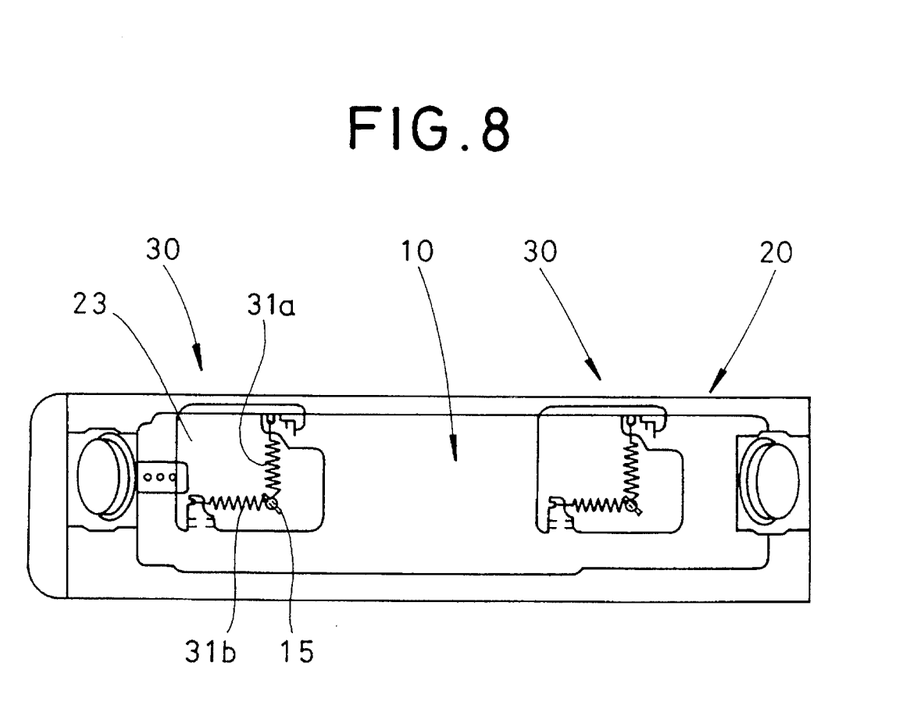
FIG. 8 is a view of a vibration damping support mechanism showing a further embodiment of the present invention associated with a third feature.

As shown in FIG. 8, a further vibration damping support mechanism of the present invention having the third feature is provided with two vibration damping elements on each side of the main reproducing unit of a reproducing apparatus. More particularly, the main reproducing unit 10 is floatingly suspended by four dampers arranged at the inner corners of an outer casing 20, similar to the construction shown in FIG. 1. Hence, the damping elements 30 are to be disposed between the main reproducing unit 10 and the outer casing 20 of the reproducing apparatus.

The two, front and rear, damping elements 30 are mounted on each side of the main reproducing unit 10; four in total are identical in the construction. The damping element 30 has two damper springs 31a, 31b arranged in the thicknesswise and depthwise directions of the main reproducing unit 10 respectively or at a right angle to each other.

The two damper springs 31a, 31b of each damping element 30 are coupled at the same ends to a hook 15 formed on the top of a projection extending outwardly from the side panel of the main reproducing unit 10.

Figure 9:
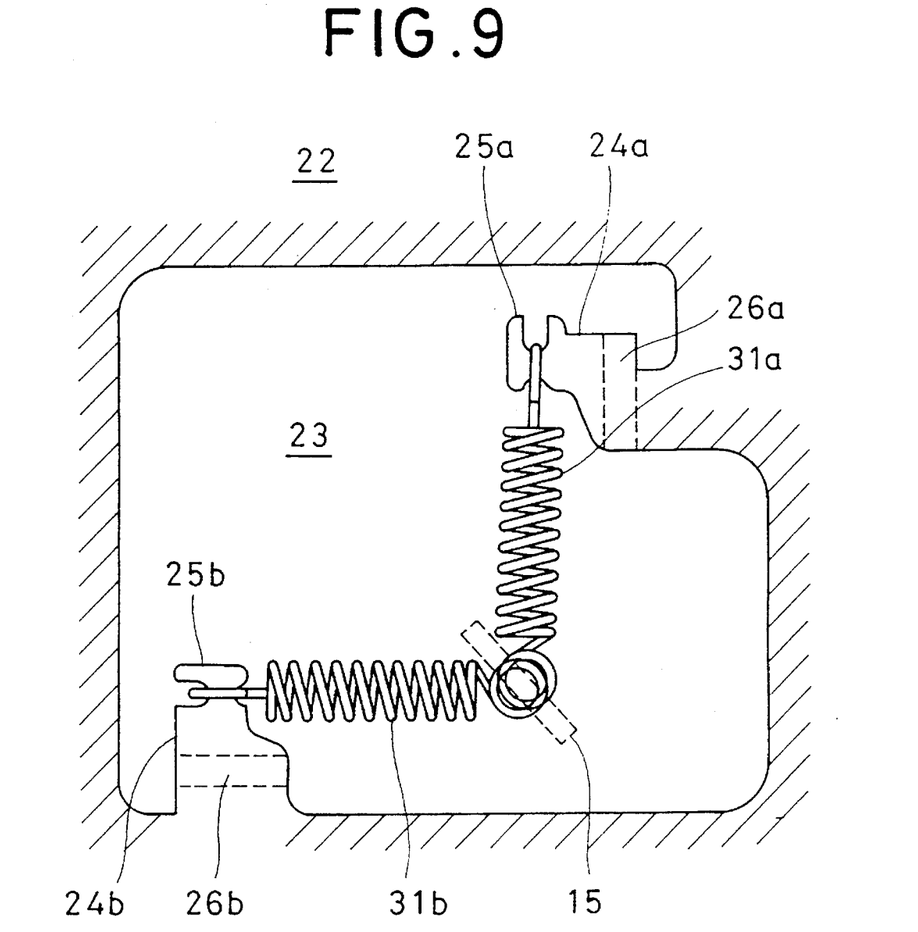
FIG. 9 is an enlarged view of the vibration damping support mechanism shown in FIG. 8.

Each side panel of the outer casing 20 incorporates a chassis plate 22 having two openings 23 formed therein to match the two damping elements 30 in one side. In each opening 23, two projections 24a, 24b are arranged extending from the chassis plate 22 as shown in FIG. 9. More specifically, the projection 24a extends in the depthwise direction of the main reproducing unit 10 while the other projection 24b extends in the thicknesswise direction of the same.

The projections 24a, 24b have at distal end holding portions 25a, 25b for holding the other ends of the two damper springs 31a, 31b respectively. The projections 24a, 24b also have at proximal end reinforcement ribs 26a, 26b arranged thereon respectively for minimizing deformation or distortion of the projections 24a, 24b caused by the opposing forces of the damper springs 31a, 31b and spacing the hook ends of the damper springs 31a, 31b in engagement with the projections 24a, 24b of the chassis plate 22 from the inner wall of an enclosure.

As the damper springs 31a, 31b are set in the thickness- and depthwise directions respectively of the main reproducing unit 10, the shifting of the damper springs $4a_1$ to $4a_4$ of their respective rotary plates $4c_1$ to $4c_4$ from one position to the other explained in FIG. 1 will be no more needed.

When the reproducing apparatus is placed in the horizontal position as shown in FIG. 8, its main reproducing unit 10 is suspended by the damper springs 31a in the outer casing 20. During the running, external vibration and shock provide stresses in the thicknesswise direction of the main reproducing unit 10. In motion, the vibration and shock are absorbed by the elastic action of a group of the thicknesswisely or vertically extending damper springs 31a. The other group of the damper springs 31b remains free in the depthwise direction.

Similarly, when the reproducing apparatus is placed in the vertical position, its main reproducing unit 10 is suspended by a group of the depthwisely extending damper springs 31b in the outer casing 20. The vibration and shock which provide stresses in the depthwise direction of the main reproducing unit 10 during the running are absorbed by the elastic action of the damper springs 31b with equal success. Also, the other group of the damper springs 31a remains elastic in the thicknesswise direction of the main reproducing unit 10.

In action, either group of the damper springs 31a or 31b works corresponding to the position of the main reproducing unit 10 and during the running, prevents external vibrations from propagating directly to the main reproducing unit 10. In case that the reproducing apparatus has to be placed in a tilt position due to the availability of an installation space limited by the other components, the damper springs 31a, 31b serve in combination as cushion elements to avoid direct propagation of unwanted vibrations to the main reproducing unit 10.

Figure 10:
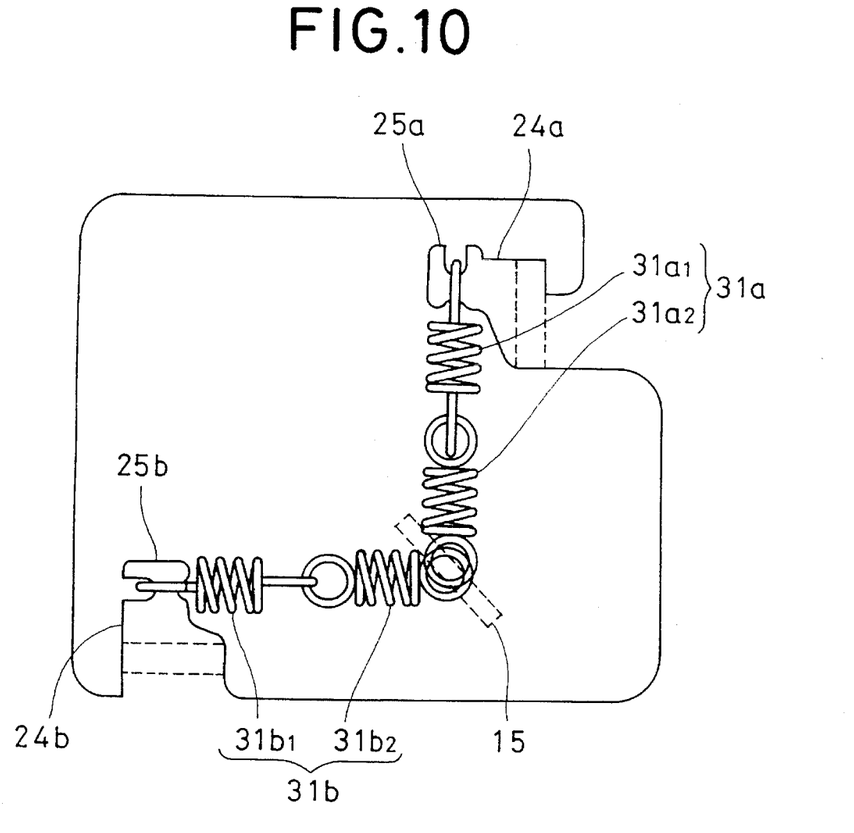
FIG. 10 is a view of a vibration damping support mechanism in which each damper spring consists of a pair of springs coupled directly to each other.

The elastic action of one group of the damper springs (31a as illustrated in FIGS. 8 and 9) by which the main reproducing unit 10 is suspended may be interfered with by the other group of the damper springs (31b). For elimination of the interference of the opposite damper spring 31b or 31a, the damper spring 31a or 31b is preferably consisted of a couple of springs $31a_1$ and $31a_2$ or $31b_1$ and $31b_2$ which are coupled to each other in a row, as shown in FIG. 10.

Figure 11:
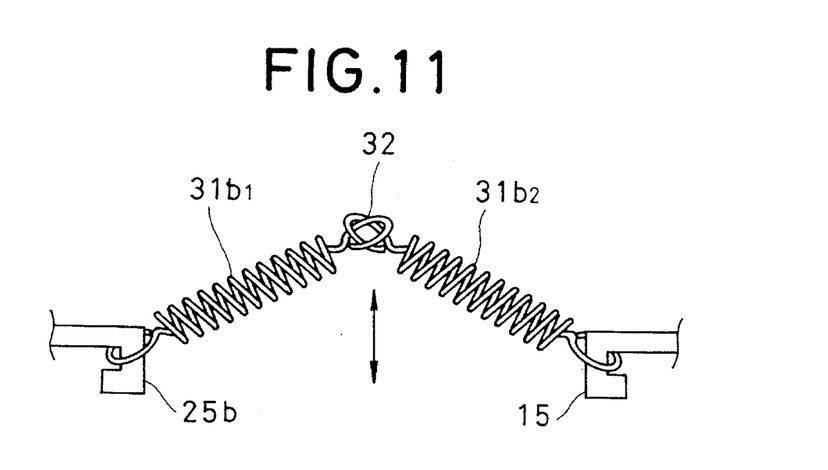
FIG. 11 is a view showing the joint between the two springs of FIG. 10 displaced.

When the damper springs 31a suspending the main reproducing unit 10 are in action with the other damper springs 31b set stationary between the hooks 15 and the holding portions 25b, their elastic effect will be attenuated more or less due to interference thus providing an unsatisfactory damping action. In an equal case, the damper spring 31b consisting of the two springs $31b_1$, $31b_2$ can however allow the joint 32 between the two springs $31b_1$ and $31b_2$ to move upward and downward as best shown in FIG. 11. Accordingly, the interference effect of the damper springs 31b is minimized and the damper springs 31a will perform an optimum elastic action preventing the direct propagation of external vibrations to the main reproducing unit 10.

Figure 12:
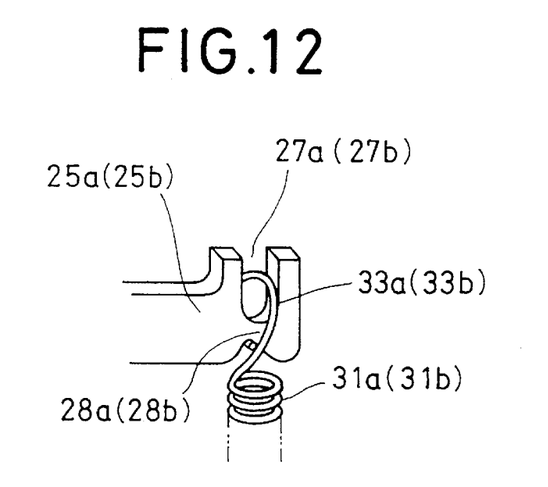
FIG. 12 is a view of the damper spring fitted loosely to a holding portion.

It is also a good idea that the damper springs 31a, 31b are coupled to their respective holding portions 25a, 25b with looseness but securely so that they are never disengaged from the same, as shown in FIG. 12. This loose coupling will also permit the elastic action of the damper springs 31a to be less interfered by the opposite damper springs 31b and thus provide maximum effects to absorb the external vibrations.

In more particular, the holding portions 25a, 25b have deep notches 27a, 27b therein respectively so that the remaining regions 28a, 28b are smaller in width than the inner diameter of end rings 33a, 33b of their respective damper springs 31a, 31b. The end ring 33a or 33b is fitted on the remaining region 28a or 28b with a proper clearance.

In action, as the damper spring 31a is loaded by the weight of the main reproducing unit 10, the opposite damper spring 31b also moves with its end ring 33b due to the clearance and will rarely interfere the elastic action of the damper spring 31a. Such a clearance may be provided between the other end of each of the damper springs 31a, 31b and the hook 15 of the main reproducing unit 10.

Figure 13:
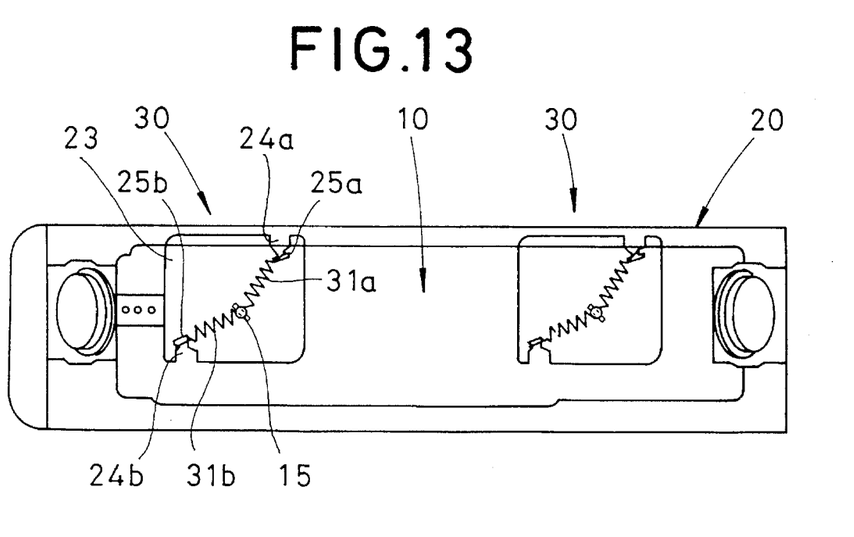
FIG. 13 is a view of a vibration damping support mechanism showing a still further embodiment of the present invention associated with a fourth feature.

FIG. 13 illustrates a further embodiment of the present invention showing a still further vibration damping support mechanism associated with the fourth feature, in which the outer casing 20 has two projections 24a, 24b at each opening 23 provided therein. The two projections 24a, 24b have holding portions 25a, 25b respectively to which two damper springs 31a, 31b are coupled at one end. The damper springs 31a, 31b are coupled at the other end to a hook 15 provided on the main reproducing unit 10 so that they extend diagonally in the opening 23 between the two holding portions 25a, 25b while being unloaded.

Figure 14:
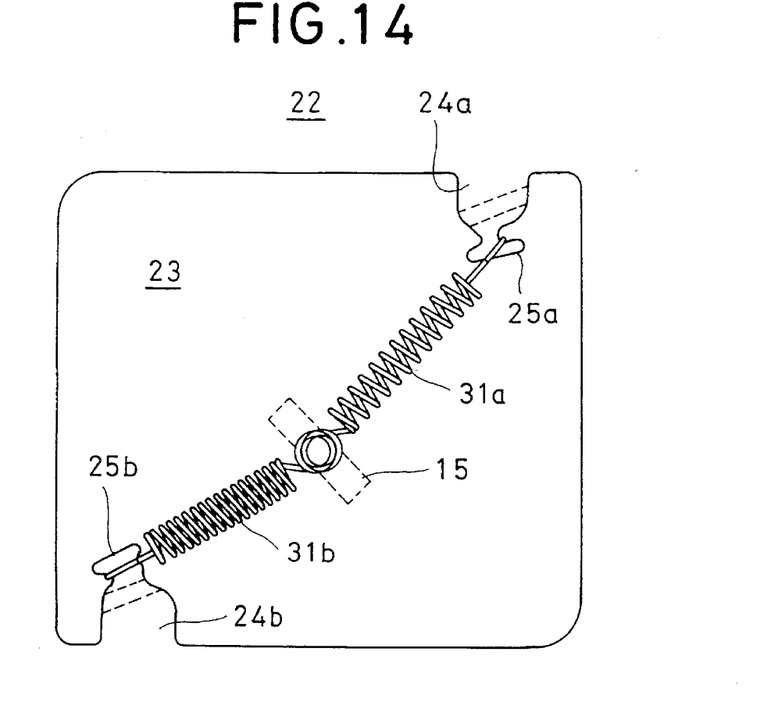
FIG. 14 is an enlarged view of the vibration damping support mechanism shown in FIG. 13.

When the reproducing apparatus is placed in a horizontal position, the weight of the main reproducing unit 10 is supported by the damper springs 31a mounted between the holding portion 25a and the hook 15. As the result, each damper spring 31a is tensioned as shown in FIGS. 13 and 14. Also, the opposite damper spring 31b mounted between the holding portion 25b and the hook 15 extends as being tensioned but less than the damper spring 31a. The elastic actions of the two damper springs 31a, 31b are rendered in combination for absorbing external vibrations exerted to the reproducing apparatus.

With the reproducing apparatus placed in a vertical position, the damper spring 31b is tensioned harder and extends more than the damper spring 31a. Accordingly, the external vibrations are absorbed mainly by the elastic action of the damper springs 31b.

As the main reproducing unit 10 is suspended in the outer casing 20, its hook 15 moves downward from its original position on a line extending between the two holding portions 25a and 25b thus producing an angle between the two damper springs 31a and 31b. This will allow the elastic action of one of the two damper springs 31a, 31b to be less interfered by the other. Accordingly, the main reproducing unit 10 placed in either the horizontal or vertical position will effectively be prevented from receiving a direct load of the external vibrations.

For minimizing the movement of the two diagonally aligned damper springs 31a, 31b in shifting from the original position to a horizontal or vertical position and ensuring the optimum elastic action of the same, the tilting angle of the two damper springs 31a, 31b is preferably predetermined to a specific degree. More particularly, the tilting angle will be determined in the following manner.

Figure 15A:
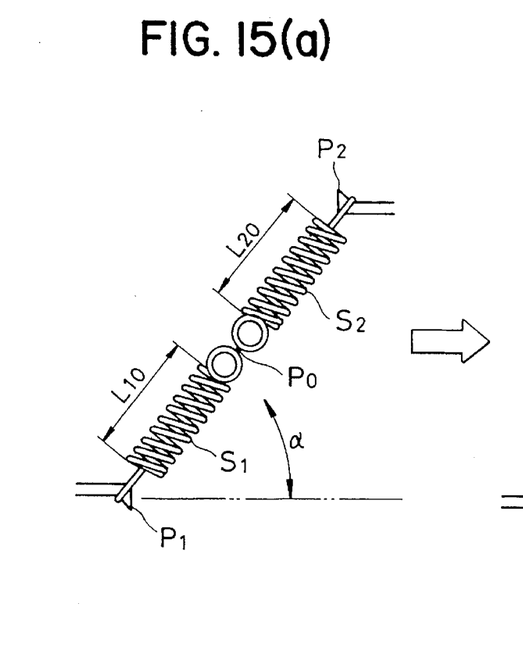
FIG. 15 is an explanatory view showing determination of a setting angle of the damper springs.
Figure 15B:
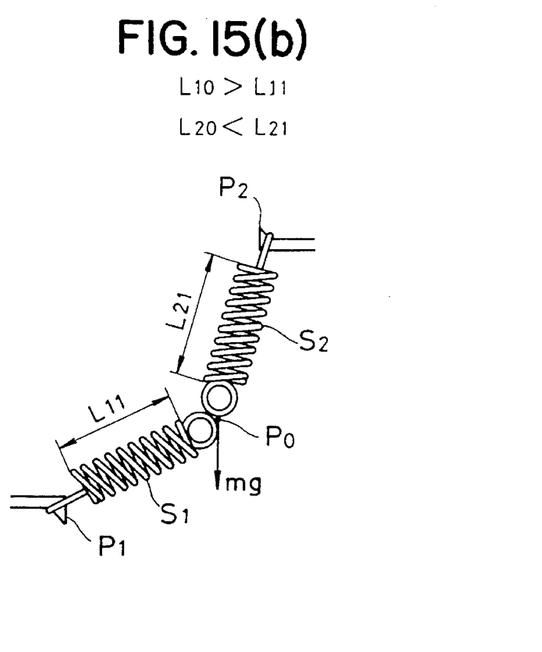

It is assumed as shown in FIG. 15 that two springs $S_1$ and $S_2$ of the same spring constant which extend from their respective support points $P_1$ and $P_2$ are coupled at a joint point $P_0$ to each other. While no load is applied to the joint $P_0$, the springs $S_1$, $S_2$ which are $L_{10}$ and $L_{20}$ respectively in the initial length rest on a reference line between the two support points $P_1$ and $P_2$. The tilting angle $\alpha$ of the two springs $S_1$, $S_2$ is expressed by an angle between the reference line from the support point $P_1$ to $P_2$ and the horizontal line.

As a load mg of weight is applied to the joint $P_0$, the spring $S_1$ is compressed to $L_{11}$ which is smaller than $L_{10}$ and the other spring $S_2$ extends to $L_{21}$ as being mostly tensioned by mg. Simultaneously, the joint $P_0$ is displaced downward from the reference line between the two support points $P_1$ and $P_2$. If the reproducing apparatus is an automotive disk changer, the counter movement or damping stroke of the main reproducing unit 10 for offsetting the energy of vibrations has to be commissioned in all directions. The displacement of the joint $P_0$ results from the action of the load mg depending on the horizontal or vertical position of the reproducing apparatus. The damping stroke of the main reproducing unit 10 will hence be guaranteed by decreasing the displacement of the joint $P_0$ to a minimum.

Figure 16:
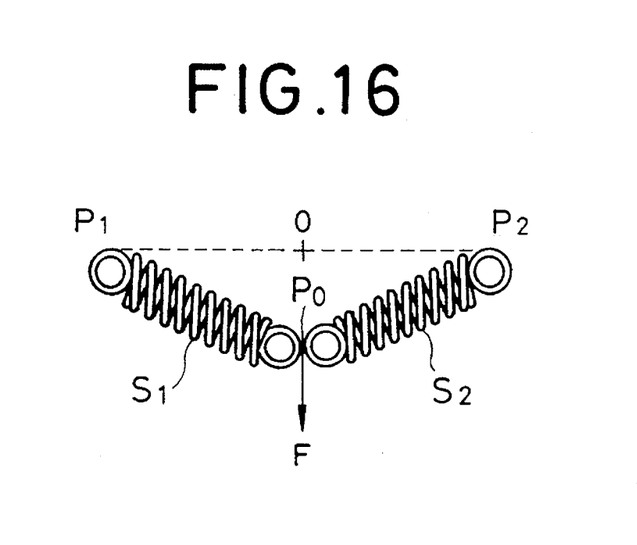
FIG. 16 is a view showing two horizontally placed springs being loaded at their joint point.

To this end, the relation of the tilting angle $\alpha$ to the displacement of the joint $P_0$ was examined. Two support points $P_1$ and $P_2$ were first determined to align in horizontal as shown in FIG. 16. A couple of springs $S_1$ and $S_2$ coupled at a joint point $P_0$ to each other were mounted between the two support points $P_1$ and $P_2$. The joint $P_0$ stayed at the original point 0 when no load was applied. When a downward force F was applied to the joint $P_0$, the two springs $S_1$, $S_2$ started extending and their joint $P_0$ moved downward from the original point 0.

Figure 17:
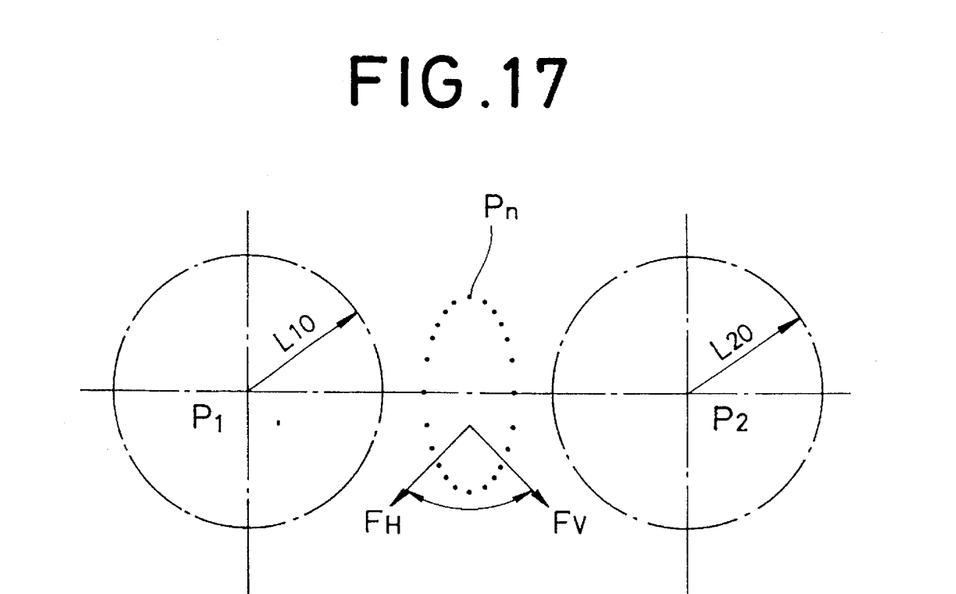
FIG. 17 is a diagram of different displaced points of the joint between the two springs showing high and low density parts of a distribution.

As the applying direction of the force F to the joint $P_0$ was varied every 15 degrees, the joint $P_0$ moved to different points $P_n$ shown in FIG. 17. As apparent from FIG. 17, a distribution of the points $P_n$ contains high and low density profiles. A low density of the points $P_n$ means that the joint $P_0$ is displaced a greater distance when the direction of application of the force F varies 15 degrees. This greater displacement will decrease the damping stroke of the main reproducing unit 10.

A high density of the points $P_n$ indicates that the joint $P_0$ was displaced a smaller distance with the force F being altered in the applying direction. Accordingly, the high density profile of the points $P_n$ is appropriated to a desired tilting range for the reproducing apparatus to minimize the displacement of the joint $P_0$ in response to shifting of the installation position and to ensure the damping stroke with consistency. When the reproducing apparatus is shifted from the horizontal position to the vertical, the direction of application of the force F varies 90 degrees.

In more particular, the high density profile of the points $P_n$ in 90 degrees is defined by two, right and left, 45-degree ranges of the application of the force F at the upper (or lower) half of the distribution of $P_n$ of which form is symmetrical about the horizontal line of FIG. 17. When the two support points $P_1$, $P_2$ and the joint $P_0$ are designated as the holding portions 25a, 25b and the hook 15 respectively (See FIGS. 13 and 14), the two damper springs 31a, 31b are tensioned by a force $F_H$ in the horizontal position or a force $F_V$ in the vertical position. In either case, the joint $P_0$ stays within a range of the high density profile of the points $P_n$. As is apparent, the displacement of the joint between the two damper springs 31a, 31b remains small in shifting of the position of the main reproducing unit 10 regardless of the horizontal or vertical position of the reproducing apparatus and thus, the damping stroke of the main reproducing unit 10 can be maintained optimum.

The above description with FIGS. 15 to 17 employs the two damper springs $S_1$ and $S_2$ having the same spring factor. However, the damper springs 31a, 31b of the damping mechanism are not limited to $S_1$ and $S_2$ and will be used of different spring factors with equal success. In that case, the application angle of a force F corresponding to the high density profile of the points $P_n$ in 90 degrees varies due to the spring factor difference between the two damper springs. The tilting angle $\alpha$ of the damper springs should be recalculated according to an applicable range of the applying directions of the force F.

As set forth above, the vibration damping support mechanism of the present invention allows any external stress caused by vibration and shaking during the running of a vehicle to be efficiently absorbed by the elastic action of its damper springs regardless of the horizontal or vertical position of a recorded data reproducing apparatus, thus preventing the direct propagation of the external stress to the main reproducing unit of the apparatus suspended by a floating support device. Also, when the apparatus is shifted from its original position to a horizontal, vertical, or tilting position at a given angle between 0 and 90 degrees, the resetting of the damper springs is not needed and the installation of the apparatus itself will be carried out with much ease. The reproducing apparatus equipped with the vibration damping support mechanism of the present invention will hence ensure quality playback actions for a long period of time with absence of unnecessary error, fault, and troubles.

What is claimed is:

1. A vibration damping support mechanism for use in a recorded data reproducing apparatus comprising:

spring loaded arms mounted rotatably on inner surfaces of side panels of an outer casing which contains a main recorded data reproducing unit;

damper springs mounted in one of horizontal and vertical directions between holding portions of said spring loaded arms and the side panels of said main recorded data reproducing unit; and a shift lever extending radialward from a rotating center of at least one of said spring loaded arms for rotation together with said at least one of said spring loaded arms, said shift lever planar with said spring loaded arms;

connecting means for interconnecting said at least one of said spring loaded arms with at least one other of said spring loaded arms so that they turn together; and shifting means for engaging said shift lever, only after said shifting means is inserted into said outer casing, said shifting means being parallel to said inner surface of said side panel of said outer casing to which said spring loaded arms are mounted, said shifting means mounted to said outer casing to turn both said at least one and said at least one other spring loaded arms together through 90 degrees and change the mounting direction of said damper springs, corresponding to a positional change of said recorded data reproducing apparatus from a horizontal position to the vertical position.

2. A vibration damping support mechanism for use in a recorded data reproducing apparatus comprising:

spring loaded arms mounted rotatably on inner surfaces of side panels of an outer casing which contains a main recorded data reproducing unit;

damper springs mounted in one of horizontal and vertical directions between said spring loaded arms and side panels of said main recorded data reproducing unit; and connecting rods pivotably mounted to said spring loaded arms and extended at one end outward from said outer casing, said connecting rods being planar with said spring loaded arms and parallel with said inner surface of said side panels to which said spring loaded arms are mounted, each connecting rod being arranged to automatically turn at least one of said spring loaded arms 90 degrees so as to change the mounting direction of said damper springs corresponding to the positional change of said recorded data reproducing apparatus to either a horizontal or vertical position.

3. A vibration damping support mechanism for use in a recorded data reproducing apparatus capable of operation while mounted in each of at least two positions which are different from each other with respect to a direction of vibration, the mechanism comprising:

two holding portions provided on inner surfaces of side panels of an outer casing which contains a main recorded data reproducing unit;

a holding projection provided on at least one of the side panels of said main recorded data reproducing unit generally in a depthwise plane including the center of gravity thereof; and a pair of damper springs, each of said damper springs being mounted between one of said holding portions and said holding projection and extending in a different direction from the other of said damper springs so that one of said pair of damper springs absorbs vibrations appearing in a thicknesswise direction of said main recorded data reproducing unit while the other absorbs vibrations appearing in the depthwise direction of the same.

4. A vibration damping support mechanism for use in a recorded data reproducing apparatus capable of operation while mounted in each of at least two positions which are different from each other with respect to a direction of vibration, the mechanism comprising:

two holding portions provided on inner surfaces of side panels of an outer casing which contains a main recorded data reproducing unit;

a holding projection provided on at least one of the side panels of said main recorded data reproducing unit generally in a depthwise plane including the center of gravity thereof; and a pair of damper springs, each of said damper springs being mounted between one of said holding portions and said holding projection, said pair of damper springs being arranged so as to tilt at a variable angle such that movement of said holding projection is limited to a small area while a load is applied in different directions.

* * * * *